United States Patent [19]

Drexler

[11] Patent Number: 4,656,346
[45] Date of Patent: * Apr. 7, 1987

[54] SYSTEM FOR OPTICALLY READING AND ANNOTATING TEXT ON A DATA CARD

[75] Inventor: Jerome Drexler, Los Altos Hills, Calif.

[73] Assignee: Drexler Technology Corporation, Mountain View, Calif.

[*] Notice: The portion of the term of this patent subsequent to Sep. 2, 2003 has been disclaimed.

[21] Appl. No.: 721,384

[22] Filed: Apr. 9, 1985

Related U.S. Application Data

[63] Continuation-in-part of Ser. No. 673,572, Nov. 21, 1984, Pat. No. 4,544,835, which is a continuation-in-part of Ser. No. 566,966, Dec. 29, 1983, Pat. No. 4,500,777, which is a continuation-in-part of Ser. No. 492,691, May 11, 1983, abandoned, which is a continuation-in-part of Ser. No. 283,833, Feb. 27, 1981, abandoned.

[51] Int. Cl.⁴ .......................................... G06K 13/07
[52] U.S. Cl. .................................... 235/487; 235/493
[58] Field of Search ................. 235/487, 493; 369/14, 369/100, 275; 346/76 C, 135.1

[56] References Cited

U.S. PATENT DOCUMENTS

| | | |
|---|---|---|
| 3,873,813 | 3/1975 | Lahr. |
| 4,190,843 | 2/1980 | Spong .................................. 346/1.1 |
| 4,197,986 | 4/1980 | Nagata ................................ 235/379 |
| 4,202,491 | 5/1980 | Suzuki ................................ 235/491 |
| 4,209,804 | 6/1980 | Dil ..................................... 358/128.5 |
| 4,224,666 | 9/1980 | Giraud ................................ 364/200 |
| 4,230,939 | 10/1980 | de Bont et al. ..................... 235/491 |
| 4,269,917 | 5/1981 | Drexler et al. ....................... 430/16 |
| 4,278,756 | 7/1981 | Bouldin et al. ..................... 430/414 |
| 4,278,758 | 7/1981 | Drexler et al. ..................... 430/616 |
| 4,298,684 | 11/1981 | Bouldin et al. ..................... 430/616 |
| 4,300,143 | 11/1981 | Bell .................................... 346/135.1 |
| 4,304,990 | 12/1981 | Atalla ................................. 235/380 |
| 4,305,081 | 12/1981 | Spong ................................ 346/135.1 |
| 4,313,188 | 1/1982 | Bartolini ............................. 369/109 |
| 4,314,260 | 2/1982 | Drexler .............................. 346/76 L |
| 4,345,261 | 8/1982 | Wilkinson .......................... 346/76 L |
| 4,609,812 | 9/1986 | Drexler .............................. 235/487 |

OTHER PUBLICATIONS

SPIE, vol. 239, Optical Disk Technology (1982), p. 202.

Primary Examiner—Harold I. Pitts

[57] ABSTRACT

A system for reading and recording information on a double-striped card has a first laser and photodetector for reading and writing data on a strip of optical contrast direct-read-after-write laser recording material disposed on one side of the card. A second laser and photodetector read prerecorded data on a strip of optical contrast optical data storage material disposed on the card. This read only strip may be disposed either on the same or opposite sides of the card from the first strip. Independently controlled servo mirrors linked with software or mechanically linked servo mirrors allow simultaneous reading or reading and writing of data on opposite sides of the card. Annotations to prerecorded text from books, journals, manuals and the like may be recorded on the read/write strip in positions corresponding to positions on the read only strip containing corresponding text.

13 Claims, 5 Drawing Figures

SYSTEM FOR OPTICALLY READING AND ANNOTATING TEXT ON A DATA CARD

CROSS REFERENCE TO RELATED APPLICATION

This application is a continuation-in-part of prior application Ser. No. 673,572, filed Nov. 21, 1984, now U.S. Pat. No. 4,544,835 which is a continuation-in-part of prior application Ser. No. 566,966, filed Dec. 29, 1983, now U.S. Pat. No. 4,500,777, granted Feb. 19, 1985, which was a continuation-in-part of prior application Ser. No. 492,691, filed May 11, 1983, now abandoned, which was a continuation-in-part of prior application Ser. No. 238,833, filed Feb. 27, 1981, now abandoned.

TECHNICAL FIELD

The invention relates to an optical information storage system for reading and recording information on a card.

BACKGROUND ART

Dil, in U.S. Pat. No. 4,209,804, teaches a reflective information recording structure which contains prepressed V-shaped grooves in which data may be recorded by local melting of the reflective metal coating by a laser. The data on the media is read by means of optical phase shift effects. Since the preformed grooves are at an optical phase depth of 95 to 140, the reading laser must be of the precise wavelength corresponding to the groove depth. The information area has a width of approximately 0.6 microns, so a thick protective substrate, usually 1200 microns deep is used to ensure that one micron surface dust particles are out-of-focus for the read beam.

Such thick protective materials cannot be used for wallet cards which have a total thickness of only 800 microns under ISO (International Standards Organization) standards and further it would be uncomfortable to carry a rigid card in trouser pockets or wallets. Also, it is difficult to bond a phase sensitive recording/reading surface to a protective laminating material with an adhesive without introducing a varying phase shicft across the surface. It is also impractical to melt large holes since a large lip would be formed around the hole causing a great distortion of the phase shift. Edge transition of the hole is the phase shift which is measured, and since the height of the lip is directly proportional to the square root of the hole diameter, phase shift reading is only practical for small holes. For example, a 25 micron diameter hole creates a lip with one micron height, which is much larger than the wavelength of the reading beam. Thus for large holes and bonded protective materials it is desirable to have a recording/reading structure that does not rely on phase shifts.

Lahr in U.S. Pat. No. 3,873,813 teaches a debit card in which use is indicated by alteration of a spot of heat sensitive coating in a selected area thereby permanently changing the reflective characteristics of that area. A reflective heat sensitive material becomes transparent on heating, thereby exposing an underlying strip of black paper which then absorbs the light energy. Recording requires exposure to a high intensity light beam for 0.7 second to raise the temperature of the material to 175 F. and an additional 5 milliseconds above 175 F. This type of credit card system permits recording of less than two data bits per second. Because of the retained, diffused liquid, the sizes of the data spots are large and difficult to regulate. This card requires a blue read beam, therefore scratches and surface dust will cause a large number of data errors unless very large data spots are used that reduce capacity to under 10,000 bits. While this data capacity is satisfactory for some debit and credit cards, it is unsuitable for detailed recording of text of books, journals, manuals, catalogues, directories and other published works. Also, the recording rate of less than two bits per second would make it unacceptable for use in most applications. Another disadvantage of this card is that all of the data is destroyed if its temperature reaches 175 C., for example on the dashboard of a car or if passed through a household washer and dryer.

Nagata in U.S. Pat. No. 4,197,986, Girard in U.S. Pat. No. 4,224,666 and Atalla in U.S. Pat. No. 4,304,990 teach updating of data cards. Nagata teaches the updating of maximum limits and balance on a card in which the complete data file is in an auxiliary memory circuit such as a magnetic disc or drum. A sales slip containing the transaction is recorded separately from the card. Giraud teaches a data-processing machine-access card containing an integrated circuit chip with a memory bank. The memory stores predetermined items of confidential data intended to authorize or prevent access to the machine. Only the balance is updated.

Atalla teaches a card in which only the balance is recorded and updated. This card can only be used where the transaction system is connected to a central computer. None of these cards has the memory storage capacity needed to accumulate records of past transactions, nor to add annotations and other information related to these records.

Various recording media have been developed for use on a rotating disc format. Because the disc is spinning rapidly, short laser pulse times (on the order of 500 nanoseconds) are necessary to confine the heating to small spots. The media have been developed to increase the sensitivity to the beam by varying the parameter of media absorptivity. Spong in U.S. Pat. Nos. 4,190,843 and 4,305,081 puts an absorptive dye layer over a reflective aluminum layer. Spots are recorded by ablation of the dye layer exposing the underlying reflective layer. Bell in U.S. Pat. No. 4,300,143, teaches a similar technique. Bartolini in U.S. Pat. No. 4,313,188 adds a protective layer between the dye layer and the reflective layer. Wilkinson in U.S. Pat. No. 4,345,261 uses a light absorptive silica dielectric layer in place of the dye layer. Terao teaches an inorganic absorptive layer over an organic recording film layer. Holes are formed in the film layer by heat generated in the absorptive layer. Suzuki in U.S. Pat. No. 4,202,491 uses a fluorescent ink layer on which data spots emit infrared radiation. Improved sensitivity is obtained in these media at the expense of extra layers which increase complexity and cost. This increased sensitivity is not necessary for a card format.

DISCLOSURE OF INVENTION

It is an object of the present invention to devise a data card system for recording by the user of digital annotations and the like, along with prerecorded original text, on a wallet-size data card.

Another object of the invention is to devise a data card system in which the annotations recorded on the data card can be viewed simultaneously with the corresponding original text, also on the card.

These objects were met with a wallet-size data card only 800 microns thick containing two strips of reflective optical storage material. One strip is a laser recordable strip using data spots up to 25 microns in size to minimize reading errors and which also contains prerecorded information, such as reference position information, on the strip. The second strip is a read-only strip having prerecorded original text data which is machine readable information. The card is formed by first prerecording information on the strips, adhering the first strip on one side of the card base, adhering the second strip on either the same or the opposite side of the card base, bonding protective, transparent material over the strips and then recording additional information on the first strip with a laser at positions corresponding to positions on the second strip containing related information. The relationship between the positions of the annotations on the first strip and the related information on the second strip can be accomplished by use of either hardware or software. One example of the use of hardware is to mechanically couple the two read heads. An example of the use of software is to label each track and location on each track and establish a one-to-one correspondence between positions on each strip. The prerecording can be done by photolithography, laser recording or surface molding.

The card is read and recorded on by a system with two different detectors of reflected light, allowing simultaneous reading of both strips on the card. The information read can then be displayed in separate windows on a screen. In this way the user may add short comments or extensive annotations to a prerecorded book, periodical article or manual, that are displayed next to the section being annotated.

One of the chief advantages of the present invention is the high information capacity of laser recording media strips. Typically, high resolution laser recording materials record spots of altered reflectivity optically contrasting with the surrounding reflective field and having dimensions less than 25 microns. A high capacity laser recording material strip enables a card to carry the equivalent of hundreds of pages of text, more than ample for most applications. In addition, there is more than enough room on the first strip for making annotations and updating annotations relative to the text on the second strip. Owing to this high data capacity both of these "strips" in actuality could be parts of a single strip.

BEST MODE FOR CARRYING OUT THE INVENTION

Figure 1:
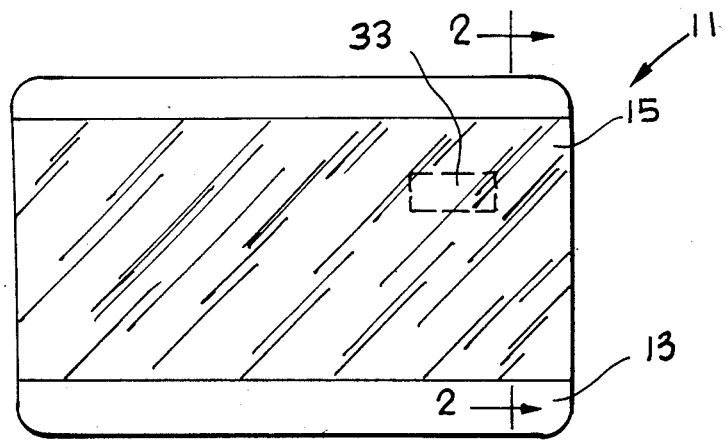
FIG. 1 is a plan view of one side of a data card in accord with one embodiment of the present invention.
Figure 2:
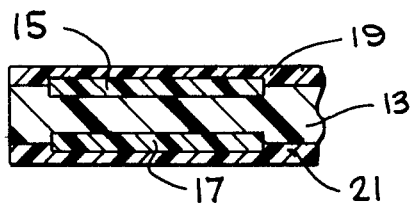
FIG. 2 is a partial side sectional view taken along lines 2—2 in FIG. 1.

With reference to FIGS. 1 and 2, a data card 11 is illustrated having a size common to most credit cards. The width dimension of such a card is approximately 54 mm and the length dimension is approximately 85 mm. These dimensions are not critical, but preferred because such a size easily fits into a pocket or wallet and has historically been adopted as a convenient size for automatic teller machines and the like. The card's base 13 is a dielectric, usually a plastic material such as polyvinyl chloride or similar material. Polycarbonate plastic is preferred. The surface finish of the base should have low specular reflectivity, preferably less than 10%. Base 13 carries strip 15. The strip is about 35 millimeters wide and extends the length of the card. Alternatively, the strip may have other sizes and orientations. The strip is relatively thin, approximately 60–200 microns, although this is not critical. The strip may be applied to the card by any convenient method which achieves flatness. The strip is adhered to the card with an adhesive and covered by a transparent laminating sheet 19 which serves to keep strip 15 flat, as well as protecting the strip from dust and scratches. Sheet 19 is a thin, transparent plastic sheet laminating material or a coating, such as a transparent lacquer. The material is preferably made of transparent polycarbonate plastic.

The opposite side of base 13 has a strip of reflective optical contrast data storage material 17. Alternatively, strip 17 may be disposed on the same side of base 13 as strip 15. Strip 17 has prerecorded machine readable information on it, adhered thereon. Strip 17 is covered by a transparent laminating sheet 21, like sheet 19, which protects strip 17 from dust and scratches and keeps it flat.

The high resolution data storage material which forms strips 15 and 17 may be any of the optical contrast laser recording materials which have been developed for use as direct read-after-write (DRAW) optical disks, so long as the materials can be formed on thin substrates. An advantage of reflective materials over transmissive materials is that the read/write equipment is all on one side of the card, the data storage capacity is doubled and automatic focus is easier. For example, the high resolution material described in U.S. Pat. No. 4,230,939 issued to de Bont, et al. teaches a thin metallic recording layer of reflective metals such as Bi, Te, In, Sn, Cu, Al, Pt, Au, Rh, As, Sb, Ge, Se, Ga. Materials which are preferred are those having high reflectivity and low melting point, particularly Cd, Sn, Tl, In, Bi and amalgams. Suspensions of reflective metal particles in organic colloids also form low melting temperature laser recording media. Silver is one such metal. Typical recording media are described in U.S. Pat. Nos. 4,314,260, 4,298,684, 4,278,758, 4,278,758, 4,278,756 and 4,269,917, all assigned to the assignee of the present invention.

The laser recording material which is selected for strip 15 should be compatible with the laser which is used for writing on it. Some materials are more sensitive than others at certain wavelengths. Good sensitivity to infrared light is preferred because infrared is affected least by scratches and dirt on the transparent laminating sheet. The selected recording material should have a favorable signal-to-noise ratio and form high contrast data bits with the read/write system with which it is used.

The material should not lose data when subjected to temperatures of about 175 F. (79 C.) for long periods. The material should also be capable of recording at speeds of at least several thousand bits/sec. This generally precludes the use of materials that require long heating times or that rely on slow chemical reactions in the presence of heat, which may permit recording of only a few bits/sec. A large number of highly reflective laser recording materials have been used for optical data disk applications.

Data is recorded by forming spots in the surrounding field of the optical contrast layer itself, thereby altering the reflectivity in the data spot with respect to the field. Data is read by detecting the optical reflective contrast between the surrounding reflective field of unrecorded areas and the recorded spots. Spot reflectivity of less than half the reflectivity of the surrounding field produces a contrast ratio of at least two to one, which is sufficient contrast for reading. Greater contrast is preferred. Reflectivity of the strip field of about 50% is preferred with reflectivity of a spot in the reflective field being less than 10%, thus creating a contrast ratio of greater than five to one.

Alternatively, data may also be recorded by increasing the reflectivity of the strip. For example, the recording laser can melt a field of dull microscopic spikes on the strip to create flat shiny spots. This method is described in SPIE, Vol. 329, Optical Disk Technology (1982), p. 202. A spot re-flectivity of more than twice the surrounding spiked field reflectivity produces a contrast ratio of at least two to one, which is sufficient contrast for reading.

Data on strip 17 is prerecorded machine readable information. The prerecording can be done by photolithography, laser recording or surface molding. After data is prerecorded on the strip 17, the strip is read only. Prerecording programming information on strip 17 or some indicating mark either on strip 17 or the card base, prevents the system from writing on strip 17.

Figure 3:
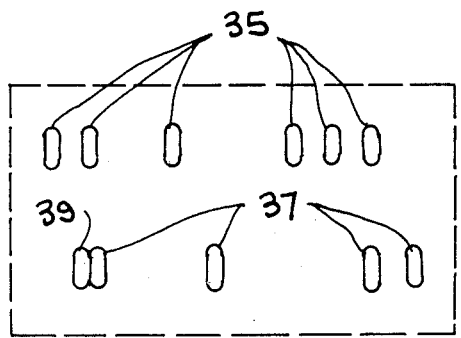
FIG. 3 is a detail of laser writing on a portion of the laser recording strip illustrated by dashed lines in FIG. 1.

With reference to FIG. 3, a magnified view of laser writing on the laser recording material strip 15 may be seen. Prerecorded data on strip 17 is similar in appearance. The dashed line 33, corresponds to the dashed line 33 in FIG. 1. The oblong spots 35 are aligned in a path and have generally similar dimensions. The spots are generally circular or oval in shape. A second group of spots 37 is shown aligned in a second path. The spots 37 have similar dimensions to the spots 35. The spacing between paths is not critical, except that the optics of the readback system should be able to easily distinguish between paths.

Presently, in optical disk technology, tracks which are separated by only a few microns may be resolved. The spacing and pattern of the spots along each path is selected for easy decoding. For example, oval spots of the type shown can be clustered and spaced in accord with self-clocking bar codes. If variations in the dimensions of a spot are required, such dimensions can be achieved by clustering spots, such as the double spot 39.

The spots illustrated in FIG. 3 have a recommended size of approximately 5 microns by 20 microns, or circular spots 5 microns or 10 microns in diameter. Generally, the smallest dimension of a spot should be less than 50 microns. In the preferred embodiment the largest dimension would also be less than 50 microns. Of course, to offset lower densities from larger spots, the size of the strip 15 could be expanded to the point where it covers a large extent of the card. In FIG. 1, the laser recording strip 15 could completely cover a single side of the card. A minimum information capacity of 250,000 bits is indicated and a storage capacity of over one million bits is preferable.

Figure 4:
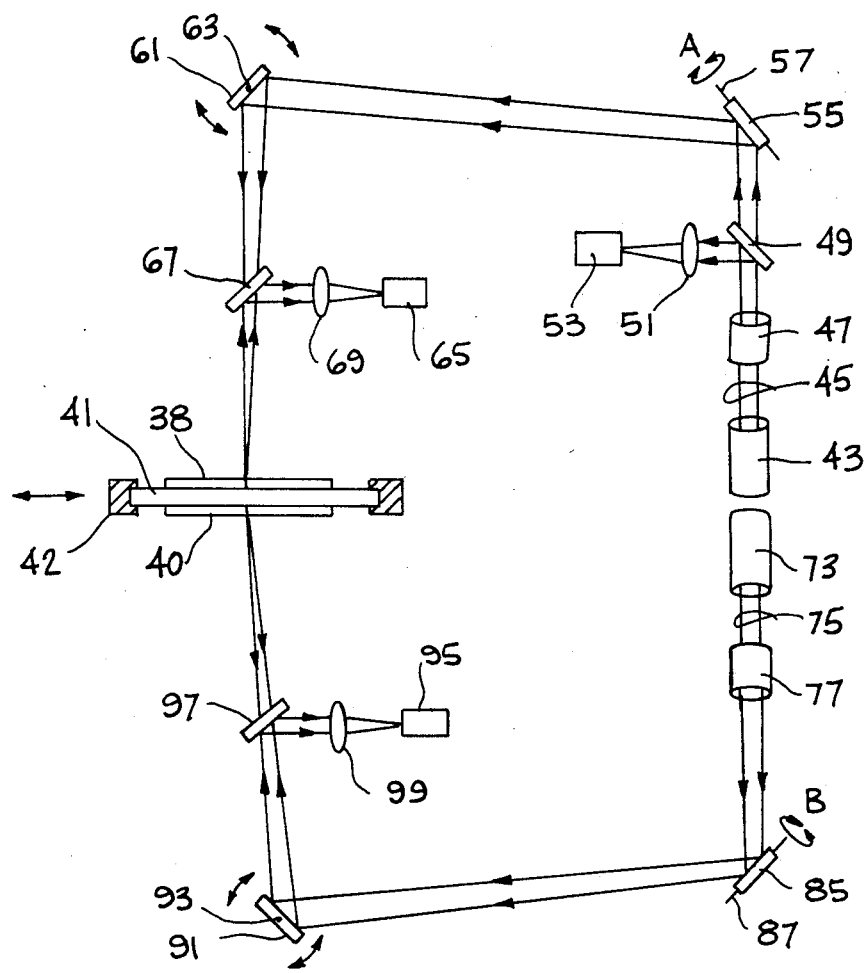
FIG. 4 is a plan view of an apparatus for reading and writing on the double sided optical recording media illustrated in FIG. 1.

In FIG. 4, a side view of the lengthwise dimension of a card 41 is shown. The optical system shown represents one embodiment of a laser read/write system. The card has a pair of data strips 38 andd 40 adhered to opposite sides of card 41. Strip 38 is laser recordable, while strip 40 has prerecorded data and is a read only strip. The card is usually received in a movable holder 42 which brings the card 41 into the trajectories of the laser beams. Laser light source 43 is preferably a pulsed semiconductor laser of near infrared wavelengths emitting beam 45 which passes through collimating and focussing optics 47. Light source 73 is either a laser or light emitting diode of near infrared wavelengths which emits beam 75 which passes through collimating and focusing optics 77. Beam 45 may be either a read beam or a write beam. Beam 75 may be only a read beam. In the read mode, laser power is lowered to about 5% of the record power. Beam 45 is sampled by a beam splitter 49 which transmits a portion of the beam through a focussing lens 51 to a photo-detector 53. The detector 53 confirms laser writing and is not essential.

The beams 45 and 75 are then directed to first servo controlled mirrors 55 and 85 respectively. Mirror 55 is mounted for rotation along axis 57 in the direction indicated by arrows A. Likewise, mirror 85 is mounted for rotation along axis 87 in the direction indicated by arrows B. The purpose of mirrors 55 and 85 is to find the lateral edges of the laser recording material in the coarse mode of operation and then in a fine mode of operation identify data paths which exist predetermined distances from the edges.

From mirrors 55 and 85, the beams 45 and 75 are directed toward mirrors 61 and 91 respectively. Mirror 61 is mounted for rotation at pivot 63, while mirror 91 is also mounted for rotation at pivot 93. The purpose of mirrors 61 and 91 is for fine control of motion of the beams along the length of the card. Coarse control of the lengthwise position of the card relative to the beams is achieved by motion of movable holder 42. The position of the holder may be established by a linear motor adjusted by a closed loop position servo system of the type used in magnetic disk drives.

Mirrors 55, 85, 61 and 91 may be under independent servo control. The servos for mirrors 55 and 61 are linked by software to the servos for mirrors 85 and 91 to allow simultaneous reading or reading and writing of both strips 38 and 40. Alternatively, mirrors 55, 85, 61 and 91 may be mechanically linked, so that one servo controls mirrors 55 and 85, while another servo controls mirrors 61 and 91. In simultaneous reading and writing of strips 38 and 40, information is recorded on strip 38 at a position corresponding to the position of related prerecorded information on strip 40. Both strips are read simultaneously from corresponding positions on the two strips, so that annotative information from strip 38 is displayed with the corresponding prerecorded text from strip 40.

In addition to text the card may be prerecorded with a preinscribed pattern containing servo tracks, timing marks, program instructions, and related functions. These positioning marks can be used as a reference for the laser recording system to record or read data at particular locations. U.S. Pat. No. 4,304,848 describes how formatting may be done photolithographically. Formatting may also be done using laser recording or surface molding of the servo tracks, having marks, programming and related functions. Dil, in U.S. Pat. No. 4,209,804 teaches a type of surface molding. Reference position information may be prerecorded on the card so that position error signals may be generated and used as feedback in motor control. Upon reading one data path, the mirror 85 is slightly rotated. The motor moves holder 41 lengthwise so that the path can be read, and so on. Likewise, mirror 55 rotates slightly upon finishing one data path. Light scattered and reflected from the spots contrasts with the surrounding field where no spots exist. The recording beam 45 should deliver sufficient laser pulse energy to the surface of the recording material to create spots. Typically, 5-20 milliwatts is required, depending on the recording material. A 20 milliwatt semiconductor laser, focussed to a five micron beam size, records at temperatures of about 200° C. and is capable of creating spots in less than 25 microseconds. The wavelength of the laser should be compatible with the recording material. In the read mode, power is lowered to about 5% of the record power.

Optical contrast between a spot and surrounding field are detected by light detectors 65 and 95 which may be photodiodes. Light is focussed onto detector 65 by beam splitter 67 and focusing lens 69. Beam splitter 97 and focussing lens 99 focus light onto detector 95. Servo motors, not shown, control the positions of the mirrors and drive the mirrors in accord with instructions received from control circuits, as well as from feedback devices. The detectors 65 and 95 produce electrical signals corresponding to spots. These signals are processed and recorded for subsequent display as useful information regarding the data transaction or entry recorded on the card.

In operation, the card of the present invention is used to record sequentially accumulated data, such as annotations to accompany prerecorded text from books, journals, manuals, and the like. The text is prerecorded on the read only data strip. The read/write strip on the opposite side of the card is used for recording the annotations. Both sides of the card may be read simultaneously so that, for instance, annotations may appear next to the text in separate windows of the display.

Figure 5:
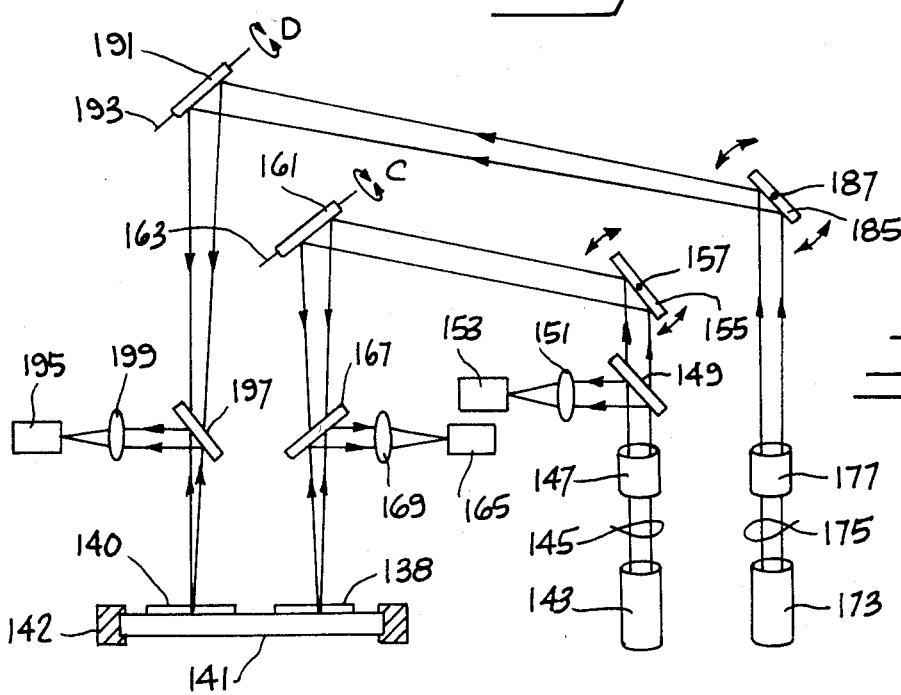
FIG. 5 is a plan view of an apparatus for reading and writing on another embodiment of a data card.

In FIG. 5, a side view of the widthwise dimension of a card 141 is shown. The optical system shown represents one embodiment of a laser read/write system. The card has a pair of data strips 138 and 140 adhered to the same side of card 141. Strip 138 is laser recordable, while strip 140 has prerecorded data and is a read only strip. The card is usually received in a movable holder 142 which brings the card 141 into the trajectories of the laser beams. Laser light sources 143 and 173, preferably pulsed semiconductor lasers of near infrared wavelengths emit beams 145 and 175 respectively which pass through collimating and focussing optics 147 and 177 respectively. Source 173 may be a light emitting diode as a preferred light source for some applications. Beam 145 may be either a read beam or a write beam. Beam 175 may be only a read beam. In the read mode, power is lowered to about 5% of the laser record power. Beam 145 is sampled by a beam splitter 149 which transmits a portion of the beam through a focussing lens 151 to a photodetector 153. The detector 153 confirms laser writing and is not essential.

The beams are then directed to first servo controlled mirrors 155 and 185 respectively. Mirror 155 is mounted for rotation at pivot 157. Likewise, mirror 185 is mounted for rotation at pivot 187. The purpose of mirrors 185 and 187 is to find the lateral edges of the laser recording material in the course mode of operation and then in a fine mode of operation identify data paths which exist predetermined distances from the edges.

From mirrors 155 and 185, the beams 145 and 175 are directed toward mirrors 161 and 191 respectively. Mirror 161 is mounted for rotation along axis 163 in the direction indicated by arrows C, while mirror 191 is mounted for rotation along axis 193 in the direction indicated by arrors D. The purpose of mirrors 161 and 191 is for fine control of motion of the beams along the length of the card. Coarse control of the lengthwise position of the card relative to the beams is achieved by motion of movable holder 142 in the lengthwise direction. The position of the holder may be established by a linear motor adjusted by a closed loop position servo system of the type used in magnetic disk drives.

Mirrors 155, 161, 185, and 191 may be under independent servo control. The servos for mirrors 155 and 161 are linked by software to the servos for mirrors 185 and 191 to allow simultaneous reading or reading and writing of both strips 138 and 140. Alternatively, mirrors 155, 161, 185 and 191 may be mechanically linked, so that one servo controls mirrors 155 and 185 for widthwise movement of both beams, while another servo controls mirrors 161 and 191 for fine lengthwise motion of both beams. In simultaneous reading and writing of strips 138 and 140, information is laser recorded on strip 138 at a position corresponding to the position of related prerecorded information being read from strip 140. Both strips are read simultaneously from corresponding positions on the two strips, so that annotative information from strip 138 is displayed with the corresponding prerecorded text from strip 140.

In addition to data the card 141 may be prerecorded with a preinscribed pattern containing servo tracks, timing marks, program instructions and related functions in the same way as the two-sided card 41 in FIG. 4. Reference position information may be used to generate position error signals for feedback in motor control. Upon reading one data path, the mirror 185 is slightly rotated. The motor moves holder 141 lengthwise so that the path can be read, and so on. Likewise, mirror 155 rotates slightly upon finishing one data path. When the servo mirrors are linked, either by software or emechanically, information that is recorded on one data path of strip 138 corresponds to information on the corresponding data path of strip 140. The manner of reading and recording data spots is the same as in FIG. 4. Strips 138 and 140 may in actuaity be parts of a single wide strip.

Optical contrast between a data spot and surrounding field is detected by light detectors 165 and 195 which may be photodiodes. Light is focussed onto detectors 165 and 195 by beam splitters 167 and 197 respectively and by focussing lenses 169 and 199 respectively. The detectors 165 and 195 produce electrical signals corrresponding to the data spots, which are processed and recorded for subsequent display. As in the double sided lens in FIG. 4, annotation information may appear next to prerecorded text in separate windows of the display.

What is claimed is:

1. A system for reading and recording information on a double sided data card comprising,
    a wallet-size card having a first strip of optical contrast direct-read-after-write recording material thereon capable of recording of machine readable information thereon, said first strip adapted for recording of subsequent sequential data, and a second strip of reflective optical data storage material thereon having pre-recorded machine readable information thereon, said second strip being read only, a writing beam means disposed in writing relation with respect to said first strip for writing sequential data thereon, a first light detector means disposed in reading relation to said first strip for reading sequential data, a reading beam means disposed in reading relation with respect to said second strip for shining reading light on said second strip, a second light detector means disposed in reading relation to said second strip for reading said prerecorded information, and means providing relative motion between the first and second beams and the card for reading and writing said information on the card.

2. The system of claim 1 wherein at least some of said subsequent sequential data are related to some of said prerecorded machine readable information.

3. The system of claim 2 wherein said subsequent sequential data are annotations to some of said prerecorded machine readable information.

4. The system of claim 2 wherein said first beam and said second beam are independently controllable for simultaneous reading of said subsequent sequential data and said related prerecorded machine readable information.

5. The system of claim 1 wherein said second strip has prerecorded programming indicia for preventing laser writing on said second strip.

6. The system of claim 1 wherein said first and second strips are disposed on opposite sides of said card.

7. The system of claim 1 wherein said first and second strips are disposed on the same side of said card.

8. The system of claim 1 wherein said first and second strips are disposed on the same side of said card and are portions of a unitary strip.

9. A method for recording annotative information on a data card comprising, disposing a data card in writing relation to a writing light beam means and in light beam reading relation to a reading light beam means, said data card having a first strip of optical contrast direct-read-after-write laser recording material thereon capable of recording of machine-readable information thereon, and a second strip of optical contrast optical data storage material thereon having prerecorded machine-readable information thereon, said second strip being read only, reading prerecorded textual information from said second strip with said reading light beam means, and writing annotative information on said first strip with said writing beam means, said annotative information being written at positions on said first strip corresponding to positions on said second strip containing textual information related to said annotative information.

10. The method of claim 9 wherein said first and second strips are disposed on opposite sides of said data card.

11. The method of claim 9 wherein said first and second strips are disposed on the same side of said data card.

12. The method of claim 9 wherein said second strip has prerecorded programming indicia for preventing laser writing thereon.

13. The method of claim 9 wherein said first and second strips are disposed on the same side of said data card and are portions of a unitary strip.

* * * * *